No. 739,658. PATENTED SEPT. 22, 1903.
G. B. DRYDEN.
VEHICLE WHEEL.
APPLICATION FILED SEPT. 20, 1901.
NO MODEL.
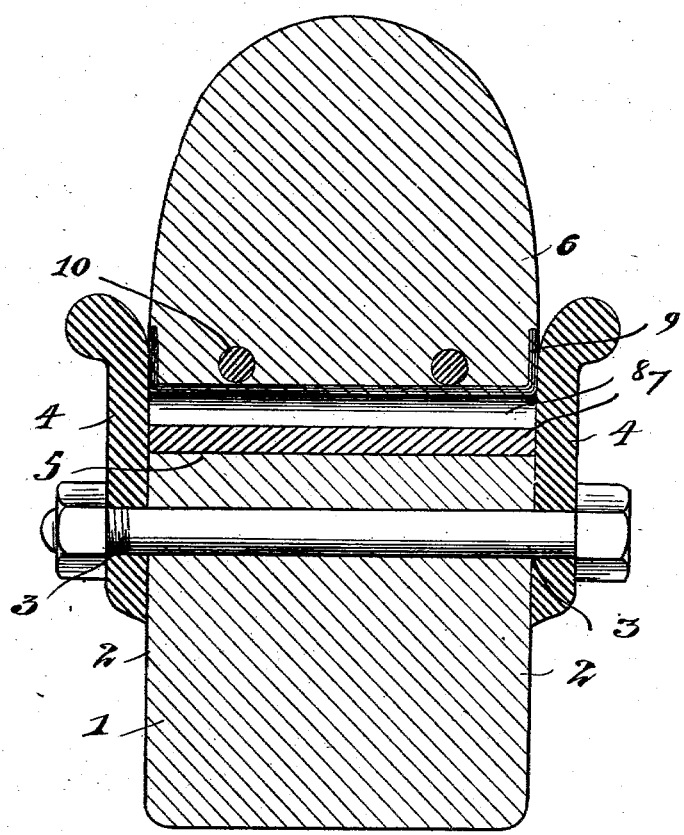
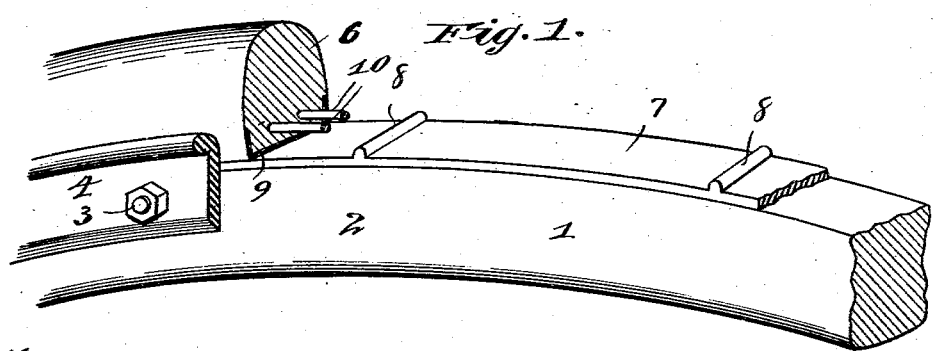

No. 739,658.

Patented September 22, 1903.

UNITED STATES PATENT OFFICE.

GEORGE B. DRYDEN, OF CHICAGO, ILLINOIS.

VEHICLE-WHEEL.

SPECIFICATION forming part of Letters Patent No. 739,658, dated September 22, 1903.

Application filed September 20, 1901. Serial No. 75,946. (No model.)

*To all whom it may concern:*

Be it known that I, GEORGE B. DRYDEN, a resident of Chicago, in the county of Cook and State of Illinois, have invented certain new and useful Improvements in Vehicle-Wheels, of which the following is a specification.

This invention relates to improvements in vehicle-wheels, and refers more specifically to an improved wheel-rim provided with a rubber or cushioning tire.

The object of the invention is to provide a simple construction in which the tire is confined accurately and securely in position both against lateral and longitudinal movement, and particularly to provide a construction embodying improved means of holding the tire against longitudinal movement or creeping without the employment of cross bolts or wires extending through the tire.

To this end the invention consists in the matters herein described, and more particularly pointed out in the appended claim, and the same will be readily understood from the following description, reference being had to the accompanying drawings, in which—

Figure 1 is a fragmentary perspective view of a portion of a wheel-rim and tire applied thereto embodying my invention, and Fig. 2 is a cross-sectional view of the same on a larger scale and taken in the plane of one of the through-bolts.

In the drawings, 1 designates a wheel rim or felly, which in the present instance is shown as substantially rectangular in cross-section having parallel lateral side surfaces 2, against which are fitted and clamped, by means of through-bolts 3, a pair of tire-flanges 4. These flanges are so constructed and arranged as to project beyond the periphery 5 of the rim a substantial distance, so as to provide an intervening channel, within which is seated the rubber tire, (designated as a whole 6.) Within the channel thus formed is seated a metal tire or band 7, which performs the usual function of a metallic tire—viz., of holding the rim of the wheel under sufficient compression to insure rigidity to the structure—and in addition to this function serves also to hold the rubber tire 6 from creeping or longitudinal movement. To this end the tire 7 is provided at short intervals apart with integral transversely-disposed ribs 8, preferably parti-circular in cross-section, as shown clearly in Fig. 1, and rising above the outer surface of the tire, so as to project into or be embedded within the base-surface of the rubber tire. The said base or under surface of the tire is provided with a plurality of layers of fabric, as indicated at 9, which layers of fabric are desirably extended up at the sides of the tire-body to a distance equal to the depth which the tire seats within the channel. In the present instance the tire is shown as secured upon the pair of endless wire wheel-rim by means of a pair of endless wire bands 10, spaced at equal distances from the median line of the tire and between said median line and the side margins thereof. Preferably these endless bands are so located in the tire as to lie closely contiguous to the upper sides of the cross-ribs 8, so that practically nothing but the plies of fabric intervenes between said bands and the ribs, as best shown in Fig. 2.

In practice the tire is placed within the rim, and before the ends of the bands are joined to form them into endless bands the tire is placed under such compression as to force the transverse ribs into the base thereof their full depths, so that the base of the tire rests firmly upon the outer surface of the metal tire between the ribs. The ends of the holding-bands 10 are then permanently united in the usual manner, thereby holding the tire securely in position. The underlying fabric serves to effectually prevent the holding-bands from cutting through the body of the rubber and similarly prevents the transverse ribs from cutting into the base of the rubber tire during wear.

It will be seen from the foregoing description that by the simple provision of the integral ribs combined with the structural features described the tire is held positively against creeping or longitudinal movement and the use of all cross-wires and through-bolts for this purpose dispensed with. The ribs may be conveniently and cheaply provided on the tire, and one of the most important results secured is in avoiding the unsightly and objectionable appearance caused by extending large numbers of bolts through the wheel rim and tire. At the same time with the construction herein shown the tire is much more durable, since it is not apertured and partially severed, but is simply creased at the points where the ribs embed themselves in its base. It will be obvious, further, that the cushioning-tire may be made of any desired width relatively to the width of the channel, so that it may be seated into the latter with very considerable compression, a thing which is impossible in the case of the employment of transverse pins embedded within the base of the tire, and this feature of seating the tire under lateral compression is also an advantage.

I claim as my invention—

In a vehicle-wheel, the combination of a wheel-rim having substantially flat parallel sides, a flat metallic band-tire mounted upon said rim and provided on its outer surface with a series of transversely-disposed, integral, rounded ribs or projections disposed entirely between the edge margins or planes of said metallic tire, a pair of independently-formed tire-flanges removably secured to the opposite sides of the rim and projecting beyond the periphery thereof, the side walls of the channel formed between said projecting flanges being substantially parallel and perpendicular to the outer surface of the metallic tire, a rubber cushioning-tire having a fabric base seated in said channel and one or more endless bands embedded in the tire-body and serving to hold the fabric base of the latter in compressed engagement with said transverse ribs, substantially as described.

GEORGE B. DRYDEN.

Witnesses:
FREDERICK C. GOODWIN,
ALBERT H. GRAVES.